H. S. MILLS.
COIN OPERATED WEIGHING SCALE.
APPLICATION FILED MAY 7, 1914.

1,155,078.

Patented Sept. 28, 1915.
6 SHEETS—SHEET 1.

Fig.1.

Witnesses:
Inventor:
Herbert S. Mills,

H. S. MILLS.
COIN OPERATED WEIGHING SCALE.
APPLICATION FILED MAY 7, 1914.

1,155,078.

Patented Sept. 28, 1915.
6 SHEETS—SHEET 5.

H. S. MILLS.
COIN OPERATED WEIGHING SCALE.
APPLICATION FILED MAY 7, 1914.

1,155,078.

Patented Sept. 28, 1915.
6 SHEETS—SHEET 6.

Witnesses:

Inventor:
Herbert S. Mills, of which the following is a specification.

UNITED STATES PATENT OFFICE.

HERBERT S. MILLS, OF CHICAGO, ILLINOIS.

COIN-OPERATED WEIGHING-SCALE.

1,155,078.  Specification of Letters Patent.  Patented Sept. 28, 1915.

Application filed May 7, 1914. Serial No. 836,993.

*To all whom it may concern:*

Be it known that I, HERBERT S. MILLS, a citizen of the United States, residing at Chicago, in the county of Cook and State of Illinois, have invented a new and useful Improvement in Coin-Operated Weighing-Scales, of which the following is a specification.

My invention relates to an improvement in the class of weighing-scales in which the scale-beam is rendered normally inoperative and requires a coin to be inserted to permit the beam to be properly poised by shifting the weight or weights; and my object is to provide improved means requiring to be actuated, to disclose, after the beam has been poised, the actual weight of a body on the scale-platform.

In the accompanying drawings.

Figure 1:
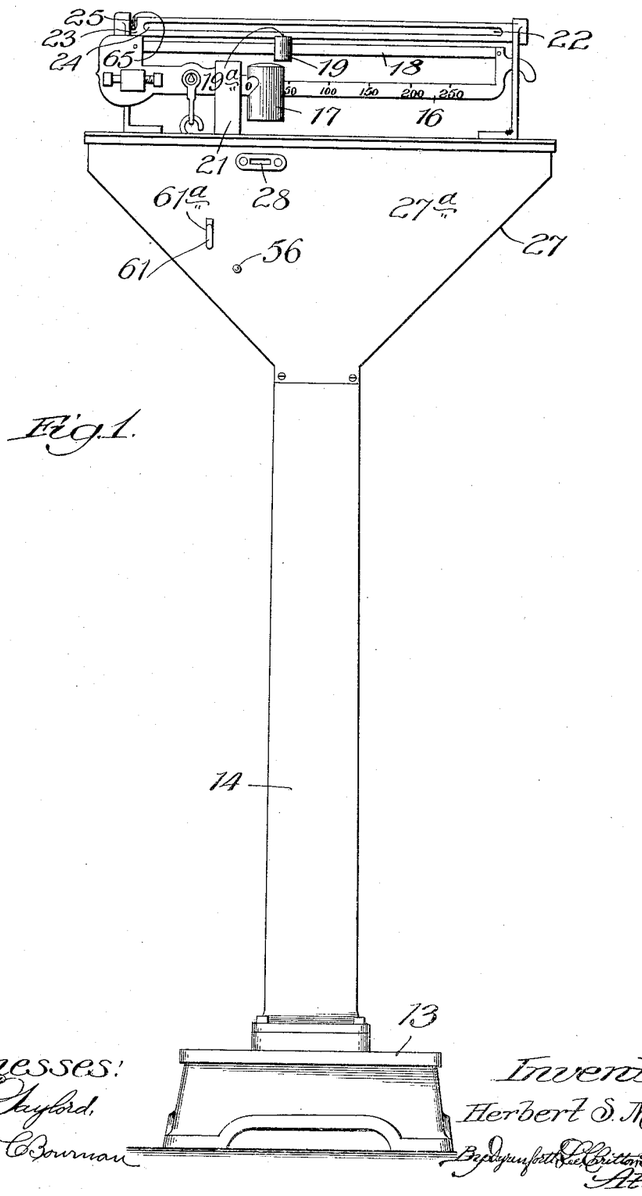
Figure 1 is a view in front elevation of a weighing-scale provided with my improvement.
Figure 2:
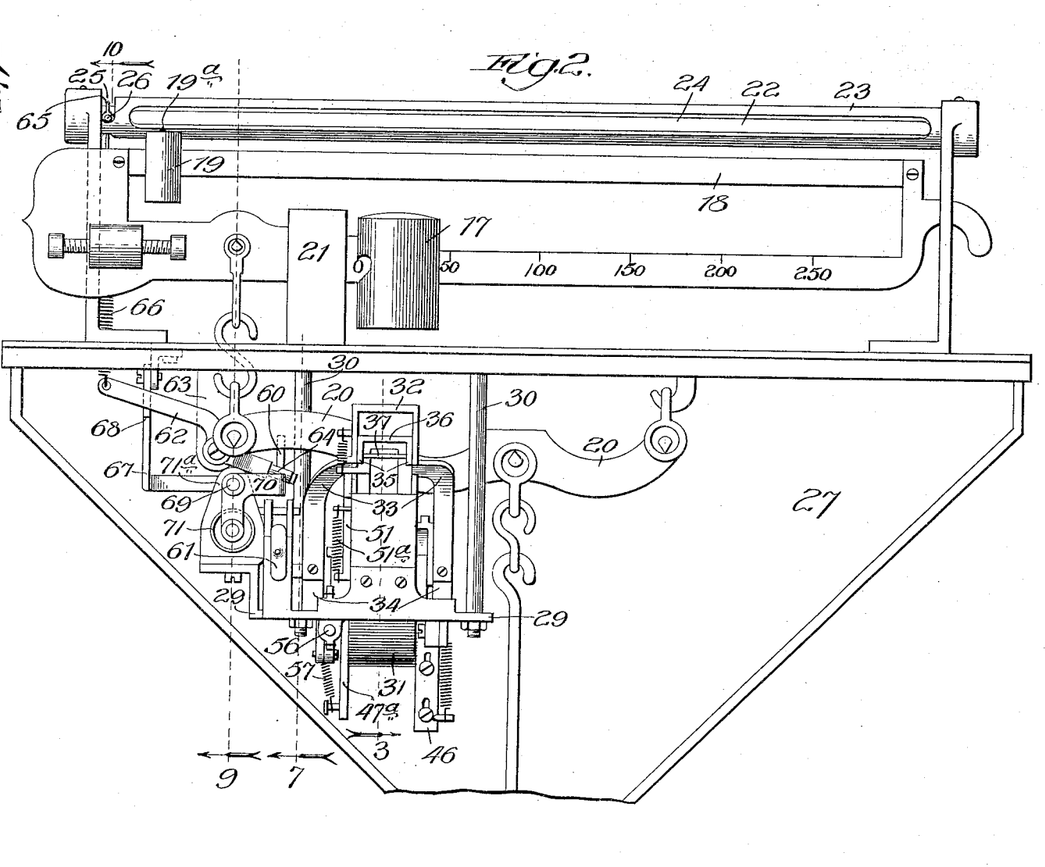
Fig. 2 shows the mechanism involving my improvement by an enlarged view in front elevation, the face-plate being removed.

The scale shown in its entirety in Fig. 1 is of well-known general construction, involving a spring-platform 13, a hollow standard 14 containing the vertical rod 15 (Fig. 2) and carrying on its head-portion the scale-beam, which comprises the usual lower member 16 carrying a sliding weight 17, and an upper member 18 carrying a sliding weight 19, shown to be provided with a pointer 19ª, but which member 18, in the present case, is devoid of weight-indicating numbers on both surfaces. The vertical rod 15 is hooked, as usual, to a lever 20 fulcrumed at one end and linked at its opposite end to the beam behind its fulcrum at 21.

In the upper ends of standards rising on the scale-head near its opposite ends is journaled a rod 22 housed in a stationary tube 23 containing a glass-covered longitudinal display-slot 24 in its face. In one end of the tube 23 is provided a transverse semi-circular slot 25, in which works a stud 26 projecting from the rod to abut against the ends of the transverse slot and limit the throw of the rod in each direction to a half-turn. This rod is provided with a longitudinal series of numbers spaced apart at intervals of 5, denoting units of pounds and arranged like the weight-indications usually provided on the upper beam-member; and these indications are normally hidden in the rod-housing to be displayed, as hereinafter described, at the slot 24.

Figure 3:
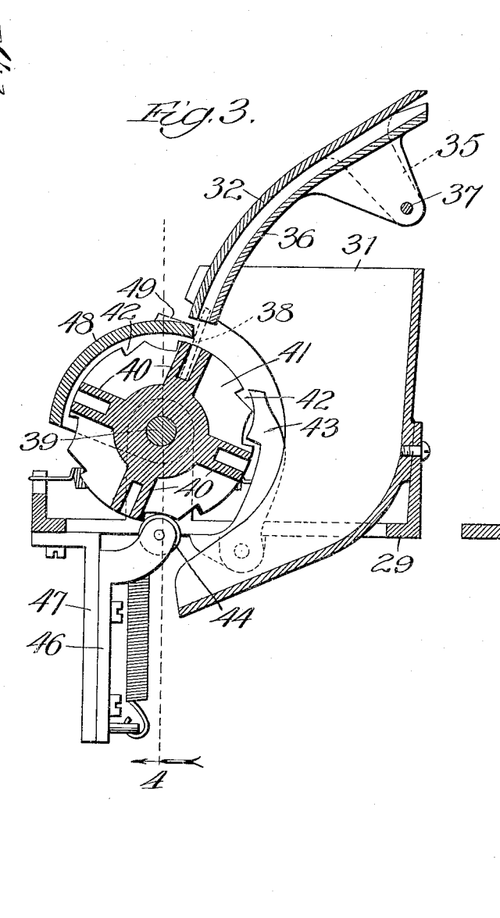
Fig. 3 is an enlarged section on line 3, Fig. 2.

One purpose of my invention is to provide means for enabling the normally-inoperative scale-beam, upon the insertion of a coin, to be poised for properly balancing a weight imposed on the platform, but without disclosing the weight until the indications on the rod 22 are made to appear at the display-slot 24. Another purpose is to automatically limit the time of each display. Mechanisms provided for these purposes are contained in the chambered head 27 of the scale, shown of general V-shape, and the face-plate 27ª of which, removed in Fig. 2, contains a coin-insertion slot 28; and these mechanisms are described as follows: A cast base-plate 29 is rigidly suspended by rods 30 from the top of chamber 27 to hang below the fulcrumed end of the scale-beam, and has bearings on its upper side for various parts of the mechanisms; and the plate is open between its ends and also has bearings on its under side. The lower section 31 of a coin-chute, having a hopper-like upper portion, and an inwardly-curved lower portion to discharge into the chamber 27 (wherein a suitable coin-receptacle, not shown, may be provided), is secured to the plate 29 near its forward edge, at the plate-opening, to extend at the lower chute-portion through that opening. The upper section 32 of the coin-chute is supported to register its mouth with the insertion-slot 28 and to extend over the section 31, by legs 33 secured to posts 34 rising on the plate 29 at opposite sides of the opening therein; and to ears 35, depending from the section 32 near its forward end, is connected a spring-pressed tongue 36 by a pivot-pin 37, passing through the ears and through corresponding ears on the tongue. This tongue forms the floor or base of the chute-section 32, being spaced from the under surface of its top to coöperate therewith in guiding an inserted coin 38 (Fig. 3) and also for retaining it in a coin-pocket, as and for the purpose hereinafter explained.

Figure 4:
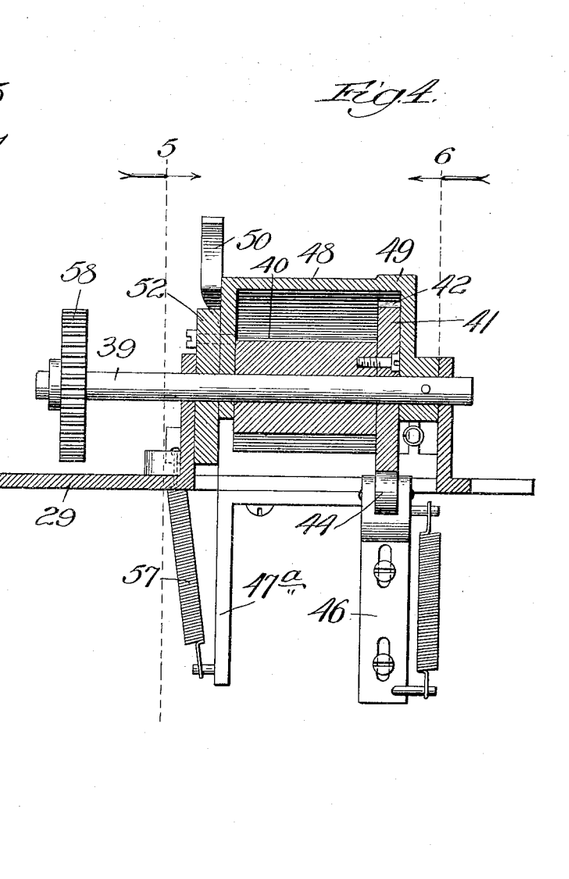
Fig. 4 is a section on line 4, Fig. 3, or on line 4, Fig. 5.
Figure 5:
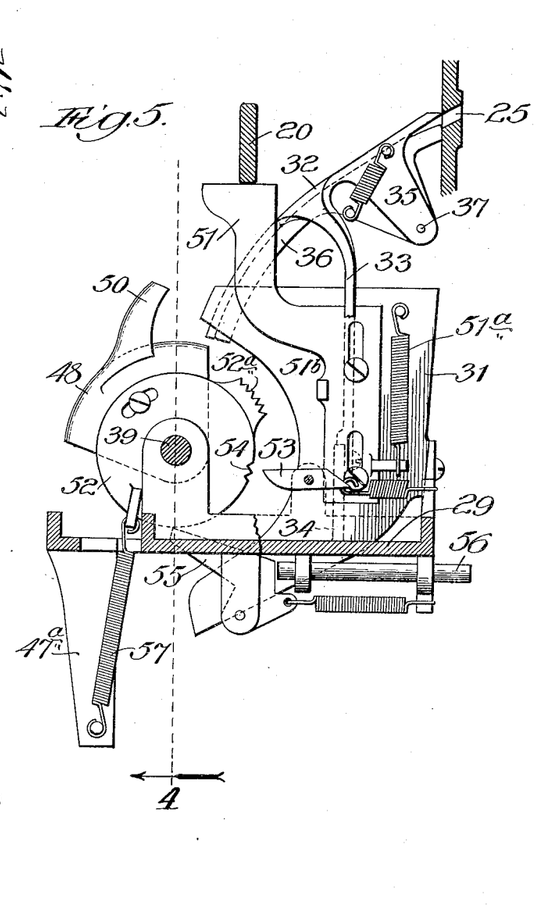
Figs. 5 and 6 are sections taken, respectively, on lines 5 and 6, Fig. 4.
Figure 6:
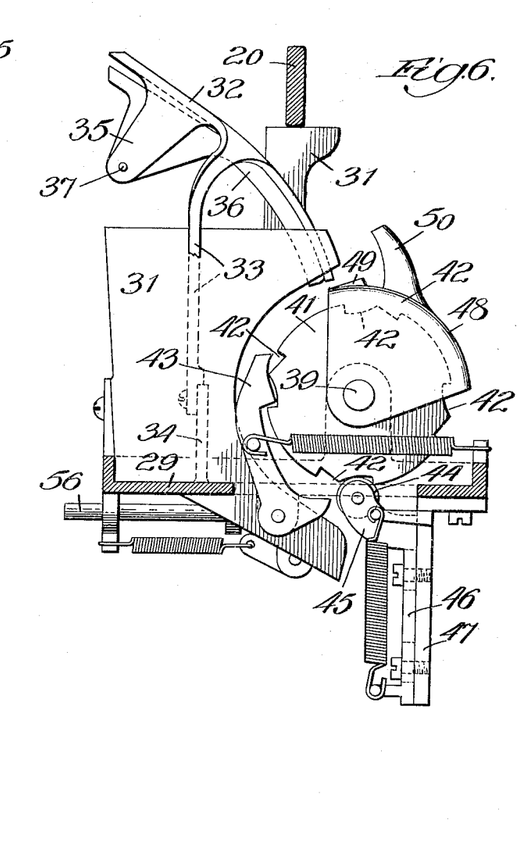

In bearings on the plate in rear of the posts 34 is journaled a shaft 39, on which is loosely supported a drum having four radial arms 40 containing coin-receiving pockets in their outer ends, shallower than the diameter of coin by which the machine is designed to be operated. One end of the drum carries a disk-head 41 provided with sets of cam-teeth 42, equi-distant apart to correspond with the arms 40, to be yieldingly engaged by a spring-pressed cam-lever 43 (Fig. 6) having a flat head, and by a spring-pressed friction-roller 44, journaled in a bifurcated finger 45 extending from the upper end of a vertical slotted arm 46 pinned through its longitudinal slots, to permit slight vertical play to the roller, to one of a pair of posts 47, 47ª, depending as a U-shaped bar from the underside of the plate 29 near its rear edge (Fig. 4). The cam-lever and friction-roller serve to arrest the drum at the end of each throw for there registering a coin-pocket in an arm 40 with the end of the upper chute-section 32 where it discharges into the lower chute-section 31. A segment shaped hood 48 is fastened at V-shaped arms on its opposite ends to the shaft to turn with it, and is provided on one end, at its forward edge, with a beveled or cam-like lug 49, into the path of which the flat top of the cam-lever 43 extends, and on its opposite end with a curved finger 50. On the left-hand wall of the lower chute-section 31 is fastened the vertical stem of a lock 51 by screws passing through longitudinal slots in the stem (Fig. 5), which is controlled by a spring 51ª (Fig. 5) to tend to raise the lock against the bottom of the lever 20 and thus prevent weighing by the scale with any even proximal degree of accuracy, since a body imposed on the scale-platform to be weighed must first overcome the resistance of the spring before the member 20 will be depressed by the weight of the body to move the scale-beam. The lock-stem has a lug 51ᵇ projecting from it into the path of the finger 50 to be encountered by the latter, in turning the hood 48, and thereby depress the lock out of engagement with the lever 20 to permit poising of the scale-beam for normal operation of the scale. To the side of the hood provided with the finger 50, is secured a disk-like head 52 surrounding the shaft and provided with a set of projecting peripheral teeth 52ª, into the path of which a spring-pressed pawl 53 extends, and a set of peripheral teeth 54 into the path of which extends a spring-pressed detent 55 pivotally supported on a bearing on the bottom of the plate 29, with its heel-portion in line with a push-rod 56 protruding at one end through the face-plate 27ª to be pressed inwardly for tripping the detent and releasing the hood to permit it to be retracted to its normal position by a spring 57 connecting the disk 52, at a lug thereon (Fig. 5), with the leg 47ª.

On the left-hand end of the shaft 39 is secured a pinion 58 (Fig. 4), in line with which is reciprocably supported in suitable bearings on the plate 29, a rack-bar 59 having an elevated cam-faced track 60 on its inner end and provided on its opposite end with a handle-portion 61 protruding through a slot 61ª in the face-plate 27ª. A lever 62, having an offset end-section, is fulcrumed between its ends on a support 63 rigidly depending from the top of the chamber 27 and carries on the end of that section an anti-friction roller 64, against which the cam-track rides. This lever is connected at its opposite end by a resilient flexible medium 65, shown as a cord containing spiral-spring sections 66, with the rotatable rod 22 at the slot 25 therein, the cord being wrapped between its ends about the stud 26, with one end fastened to the lever, and the spring 66 on its opposite end to the adjacent one of the two standards supporting the rotatable rod. An L-shaped bar 67 (Fig. 2), having a tooth or shoulder 68 on its front edge between the ends of its vertical member is pivotally suspended to hang from the top of the chamber 27 across the adjacent arm of the lever 62; and the horizontal member of this arm crosses the path of a reciprocating plunger-rod 69 fastened at its outer end in the vertical member of a rectangular bar 70, the lower end of which is secured to the piston-rod of a dash-pot device 71. The dash-pot is shown to be supported in the opposite arms of a U-shaped frame 71ª secured to a bracket on an edge of the base-plate. The inward movement of the dash-pot piston is produced by a spring 72, and the outward movement is produced by engagement of the rear blunted end of the cam-track on the rack-bar 59, in pulling it outwardly for the purpose hereinafter explained, with the inwardly turned end 70ª of the bar 70.

Figure 7:
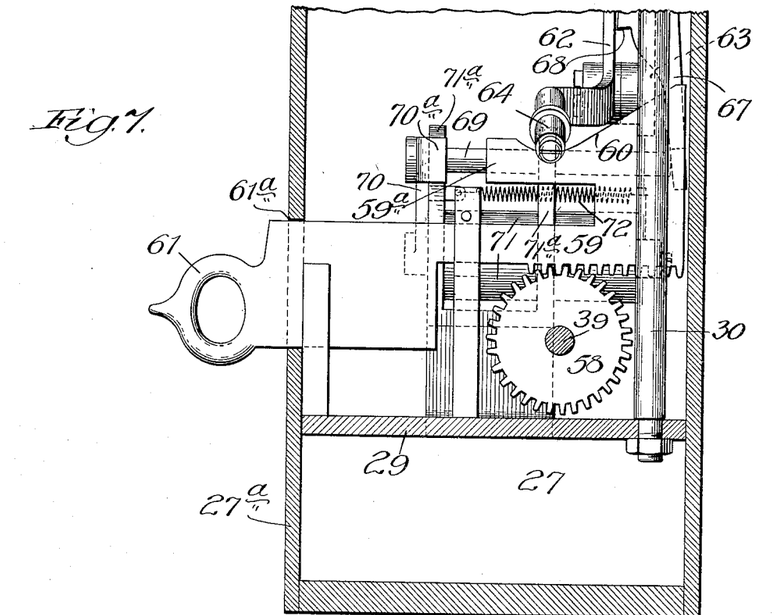
Figs. 7 and 8 are enlarged sections on line 7, Fig. 2, respectively, showing the position of parts with the operating rack-bar in its innermost, or normal, and withdrawn positions.
Figure 8:
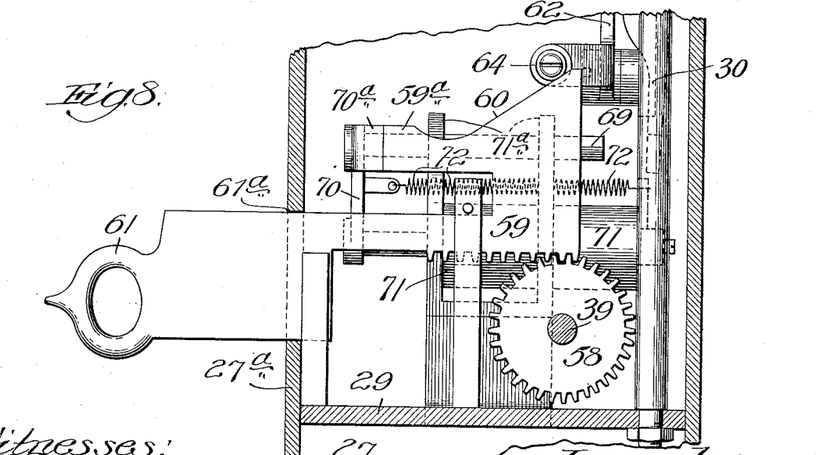
Figures 9, 10, 11, 12:
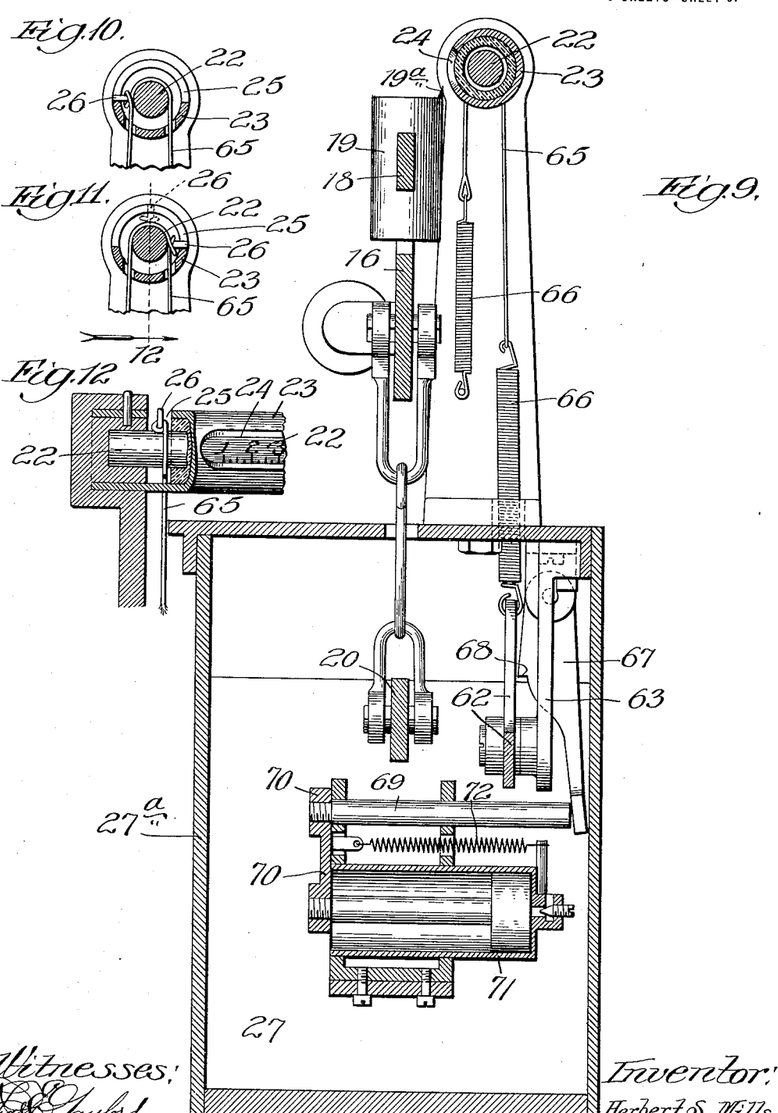
Fig. 9 is an enlarged section on line 9, Fig. 2.
Figs. 10 and 11 are broken views showing enlarged sections on line 10, Fig. 2, and respectively illustrating the stop-stud on the rotary weight-indicating rod in its opposite extreme positions, the intermediate position thereof being indicated by dotted representation in Fig. 11.
Fig. 12 is a broken view in section on line 12, Fig. 11.

The operation is as follows: In the normal position of the parts, an arm 40 registers with the chute-section 32 to receive therefrom a coin into the receiving-pocket in the arm. The rack is in its innermost position, and any attempt to pull it to its outermost position will be arrested by pulling it until it turns the shaft 39 far enough to contact the forward edge of the hood with the top of the cam-lever 43, whereby further withdrawal of the rack will be obstructed. The lock 51 is being held by its controlling spring against the under side of the beam-actuating lever 20, whereby the rod 15 cannot be depressed to turn that lever on its fulcrum to move the scale-beam until or unless the weight imposed on the scale-platform shall have overcome the resistance of the lock controlling spring 51$^a$, whereby the scale-beam, though it may be idly oscillated, is rendered inoperative for performing its proper weighing-function by the resisting action of the lock against the lever 20. The lever-roller 64 is on the lowermost portion of the cam-track 60 (Fig. 7), and the opposite arm of the lever, crossing the bar 67 above its shoulder 68, is raised by the spring-cord 65, in the normally unstretched condition of which it holds the rod turned far enough around on its journals to be stopped by the stud 26 abutting against one end of the slot 25 (Fig. 10), in which position the line of indications on the rod will face upwardly and be thus out of the display-position.

A coin inserted into the slot 28 drops down the coin-chute and lodges in a pocket in an arm 40 to project into the path of the forward edge of the hood 48. By then withdrawing the rack-bar, resultant turning of the pinion and shaft turns the hood to engage its forward edge with the section of the coin which projects beyond the receiving-pocket and the hood then turns with it the drum until that pocket in an arm 40 thereon clears the inner end of the spring-pressed tongue, which has held the coin in the meantime against dropping out of the pocket. The coin drops out on reaching that position, in which the next succeeding arm 40 registers its pocket with the discharge-end of the chute-section 32. In thus turning the shaft 39, the cam lever 43 is pressed outwardly and is cleared by the lug 49 and the finger 50 on the hood encounters the lugs 51$^b$ on the lock 51 and withdraws the latter from the lever 20 to permit the beam to be poised by a weight on the scale-platform. As will be understood, in turning the hood, engagement of the pawl 53 with the teeth 52$^a$ prevents back-turning of the hood after it has been thus partially turned in the forward direction, and at the end of its throw it is held (until tripped, as hereinafter described), by the detent 55 engaging the teeth 54 against being returned to normal position by the recoil-action of the spring 57 on the disk 52.

In pulling outwardly the rack, the cam-track 60 rides against the roller 64 and turns the lever 62 in the direction to draw downwardly on the cord 65, thereby turning the rod 22 halfway around, when it is arrested by the stud 26 encountering the opposite end of the slot 25. In this position of the rod, the line of indications faces downwardly and is out of display-position. Moreover, withdrawal to the full extent of the rack-bar has pulled outwardly the piston of the dash-pot, which is locked in that position by the detent 55. Upon then pressing the push-rod 56 to trip the detent 55, the spring 57 turns the hood back to normal position, thereby correspondingly turning the shaft and pinion 58 thereon, to retract the rack to its innermost or normal position, wherein the lowest section of the cam-track registers with the adjacent arm of the lever 62. This lever, under the recoil-force of the resilient cable 65, however, is arrested midway of the rise of its other arm by the latter encountering the shoulder 68 on the bar 67, and on that arm reaching this position the resilient cable will have turned the rod 22 through one-half of its throw to bring the line of indications upon it to display-position, wherein the stud 26 occupies the central position shown by dotted representation in Fig. 11; and in that position the rod discloses the unit-portion of the weight of the object imposed on the scale-platform to be weighed. The rotatable rod does not, however, remain in that position longer than is required for inspection of its displayed indications, for the inward movement of the dash-pot piston, under the recoil-force of its controlling spring 72, only slowly advances the plunger-rod 69 toward the horizontal section of the L-shaped bar 67; but, when the push-rod meets that section, it pushes the bar backwardly and withdraws the shoulder 68 out of the path of the lever 62, whereupon the freed spring-cord brings the lever-roller 64 against the lowermost section of the cam-track, thus into place for the next operation of the scale, and simultaneously completes the throw of the rod 22 to take its line of weight-indications out of display-position. The short interval during which this display-position lasts is intended to avoid leaving the indications on the rotatable rod exposed sufficiently long at any one time to enable a mischievous person to copy them, as by writing or scratching them at proper intervals on the upper beam member, or on the housing-tube. With the indications thus copied and exposed to view, after once operating the scale upon inserting a coin, the user could leave the rack pulled out by not tripping the detent, whereby the locking-device 51 would remain depressed and the scale could, until thus tripped, be used over and over again, like an ordinary scale, without any coin-insertions.

I realize that considerable variation is possible in the details of construction thus specifically shown and described, and I do not intend, by illustrating a single specific or preferred embodiment of my invention, to be limited thereto, my intention being in the following claims to claim protection upon all the novelty there may be in my invention as broadly as the state of the art will permit.

What I claim as new and desire to secure by Letters Patent is—

1. In a weighing-scale, a poising scale-beam, a rod rotatably supported apart from said beam and provided with weight-indications normally out of their display-position, means normally preventing said scale from weighing an object, means connected with said rod for rotating it on the insertion of a coin to turn the indications thereon into and out of their display position, means operating to render inoperative the weighing-preventing means, and arresting mechanism coöperating with said rod-rotating means to temporarily hold the rod, in turning, with said indications in their display-position.

2. In a weighing-scale, a poising scale-beam, a rod rotatably supported apart from said beam and provided with weight-indications normally out of their display-position, a tube housing said rod and having a slot for the display of said indications, a locking-device normally preventing poising of said beam to weigh an object on the scale-platform, means connected with said rod for rotating it on the insertion of a coin to turn the indications thereon in said tube, means operating to render inoperative the weighing-preventing means, and arresting mechanism actuated by said rod-rotating means to temporarily and releasably hold the rod, in turning, with said indications in their display-position at said slot.

3. In a weighing-scale, a scale-beam comprising lower and upper members, an operating-lever connected with the scale-beam, a rod rotatably supported apart from said beam and provided with weight-indications, weights on the beam-members, a locking-device normally engaging said operating-lever, and means operative on the insertion of a coin connected with said rod for rotating it to turn the indications thereon into and out of their display-position and operating to withdraw the locking-device from said operating-lever.

4. In a weighing-scale, a scale-beam comprising lower and upper members, an operating-lever connected with the scale-beam, a rod rotatably supported apart from said beam and provided with weight-indications, a tube housing said rod and having a slot for the display of said indications, a locking-device normally engaging said operating-lever, and means operative on the insertion of a coin for rotating said rod to turn the indications thereon into and out of their display-position on said tube and operating to withdraw the locking-device from said operating-lever.

5. In a weighing-scale, a scale-beam comprising lower and upper members, an operating-lever connected with the scale-beam, a rod rotatably supported apart from said beam and provided with weight-indications normally out of their display-position, a tube housing said rod and having a slot for the display of said indications, a spring-pressed locking device normally engaging said operating-lever, means for rotating said rod on the insertion of a coin to turn the indications thereon into and out of their display-position in said tube, means operating to withdraw the locking-device from said operating lever, and arresting-mechanism coöperating with said rod-rotating means to temporarily hold the rod, in turning, with said indications in their display-position at said slot.

6. In a weighing-scale, a scale-beam comprising lower and upper weight-carrying members, an operating lever connected with said beam, a rod rotatably supported apart from said beam and provided with weight-indications normally out of their display-position, a rotary shaft carrying a pinion, a finger and spring-retracted hood adapted to rotate said shaft on the insertion of a coin, a spring-detent engaging said hood and a push-rod for tripping the detent, a spring-retracted rack-bar coöperating with said pinion to rotate said hood, a spring-raised lock normally engaging said operating-lever and provided with a projection in the path of said finger, a cam-track on said rack, a lever fulcrumed between its ends and against one end of which said cam-track rides, and a spring-cord connected at one end with the opposite end of the last-named lever, fastened at its opposite end and connected between its ends with said rod, for the purpose set forth.

7. In a weighing-scale, a scale-beam comprising lower and upper weight-carrying members, an operating lever connected with said beam, a rod rotatably supported apart from said beam and provided with weight-indications normally out of their display-position, a rotary shaft carrying a pinion, a finger and a spring-retracted hood adapted to rotate said shaft on the insertion of a coin, a spring detent engaging said hood and a push-rod for tripping the detent, a spring-retracted rack-bar coöperating with said pinion to rotate said hood and provided with a cam-track, a spring-raised lock normally engaging said operating lever and provided with a projection in the path of said finger, a lever fulcrumed between its ends and against one end of which the cam-track rides, a spring cord fastened at one end and connected at its other end with the opposite end of the last-named lever and between its ends with said rod, a pivotal bar having a shoulder between its ends and hanging across said last-named lever, a dash-pot having a spring-retracted piston, and a plunger-rod connected with said piston adapted to coact with said last-named lever, for the purpose set forth.

HERBERT S. MILLS.

In presence of—
 L. HEISLAR,
 F. A. FLORELL.